United States Patent
Saka (10) Patent No.: US 11,550,964 B2
(45) Date of Patent: Jan. 10, 2023

(54) ACCOUNT-SPECIFIC SECURITY IN AN EMAIL CLIENT

(71) Applicant: VMware, Inc., Palo Alto, CA (US)

(72) Inventor: Ratna Paul Saka, Atlanta, GA (US)

(73) Assignee: VMWare, INC., Palo Alto, CA (US)

(*) Notice: Subject to any disclaimer, the term of this patent is extended or adjusted under 35 U.S.C. 154(b) by 184 days.

(21) Appl. No.: 17/154,062

(22) Filed: Jan. 21, 2021

(65) Prior Publication Data

US 2022/0229939 A1    Jul. 21, 2022

(51) Int. Cl.
  *G06F 21/00*    (2013.01)
  *G06F 21/78*    (2013.01)
  *H04L 9/08*    (2006.01)
  *H04L 51/212*    (2022.01)

(52) U.S. Cl.
  CPC ............ *G06F 21/78* (2013.01); *H04L 9/0866* (2013.01); *H04L 9/0891* (2013.01); *H04L 9/0894* (2013.01); *H04L 51/212* (2022.05)

(58) Field of Classification Search
  CPC ....... G06F 21/78; G06F 21/60; H04L 51/212; H04L 9/0866; H04L 9/0891; H04L 9/0894; H04L 9/0822
  See application file for complete search history.

(56) References Cited

U.S. PATENT DOCUMENTS

| | | | |
|---|---|---|---|
| 8,352,742 B2* | 1/2013 | Thayer | H04L 63/0428 713/168 |
| 10,182,044 B1* | 1/2019 | Praus | H04L 63/0428 |
| 2008/0056501 A1* | 3/2008 | McGough | H04L 63/08 380/282 |
| 2009/0217027 A1* | 8/2009 | Ayalon | H04L 51/00 713/150 |
| 2012/0089519 A1* | 4/2012 | Peddada | H04L 9/3297 713/169 |
| 2018/0359222 A1* | 12/2018 | Hathaway | H04L 9/0825 |

* cited by examiner

*Primary Examiner* — Yogesh Paliwal
(74) *Attorney, Agent, or Firm* — Thomas | Horstemeyer, LLP (57) ABSTRACT

Examples of account-specific security in an email client are disclosed. A master key can be generated by the email client. The master key can be used to encrypt account specific account keys. Email data in the email database accessed by the email client can be encrypted by the account keys.

20 Claims, 4 Drawing Sheets

ACCOUNT-SPECIFIC SECURITY IN AN EMAIL CLIENT

BACKGROUND

Mobile devices are being used for access to enterprise computing systems and resources with greater frequency. The use of these personal devices can be associated with productivity gains and cost savings. The concept "bring your own device" (BYOD) for access to enterprise computing systems may have met initial resistance due to security concerns, but more and more companies are now looking to incorporate BYOD policies.

As a result, users may utilize a mobile device to access enterprise resources as well as personal resources. In some cases, users may use the same application installed on a mobile device to access enterprise or work resources that is used to access personal resources. For example, an email client installed on the user's mobile device can be used to access personal data as well as enterprise data. For example, the email client can be used to access a personal email account as well as an enterprise email account.

Enterprises might desire to separate enterprise and personal data on user devices. In some cases, separate workspaces might be utilized in which data cannot be shared between the workspaces. However, separate workspaces might degrade the user experience, as users are often multitasking between personal and enterprise tasks throughout a typical day.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

Mobile devices are being used for access to enterprise computing systems and resources with greater frequency in an enterprise environment. Additionally, mobile devices are also used to access personal data, such as personal email accounts. Information security concerns and requirements within an enterprise can cause restrictions on users. However, enterprises are increasingly allowing users to bring their own devices to work by adopting bring your own device (BYOD) policies. BYOD policies can allow users to use their own personal devices to access enterprise resources such as email, documents, third party services, and the like. Additionally, even with enterprise issued devices, enterprises can allow users to access personal information, such as personal email accounts, websites, documents, and other information.

However, enterprise customers are often security conscious with respect to enterprise data. Therefore, enterprise security requirements might require encryption of data at rest with encryption keys of a minimum strength. Additionally, these security requirements can also require separation of enterprise data from personal data.

An email client can be utilized to access enterprise email as well as personal email of the user. For example, the enterprise might provide an account on an email service that is hosted by the enterprise or a third party. The user can utilize an email client installed on the user's device to access the enterprise-provided email account. Email clients can encrypt a database or data store in which data pertaining to the email account can be stored. For example, the mailbox that includes the email messages, contacts, calendar, and other data pertaining to the account ben be stored in a data store in which the stored data is encrypted. The data can be encrypted using an encryption key. The encryption key can be generated by the email client or issued to the email client as a certificate by a management service with which the client device running the email client is enrolled.

The email client can also allow the user to access a personal or a second email account in addition to the enterprise email account. In some email clients, the data pertaining to the second email account might be encrypted using the same encryption key that is used to encrypt the data that is stored in a database or data store that corresponds to the personal email account. Using the same encryption key can be problematic in the event that the key is somehow compromised. For example, if an attacker utilizes social engineering to cause the user to follow a malicious link that exploits a weakness in the email client, the encryption key might be exposed. Even if there are no exploitable weaknesses in the email client, an enterprise might desire or require that data associated with enterprise information be stored separately from or encrypted using a unique encryption key.

Therefore, examples of this disclosure can provide a framework in which separate encryption keys are utilized to encrypt data for different email accounts in an email database or data store of an email client. By utilizing separate keys for separate email accounts, the encryption key utilized for an enterprise email account and for a personal email account that are accessed through the email client.

Figure 1:
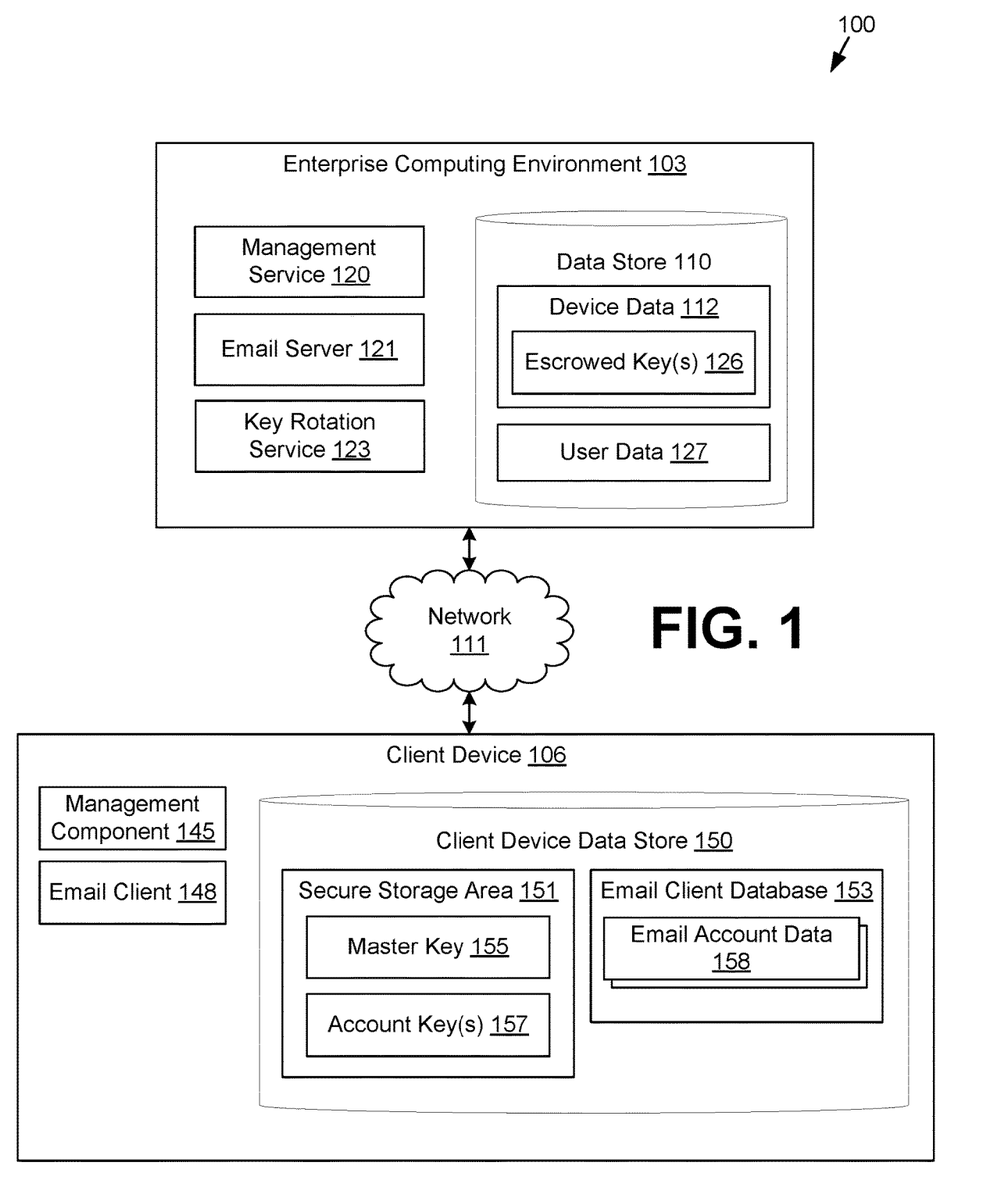
FIG. 1 illustrates an example networked environment for according to various examples described herein.

Turning to the drawings, the following paragraphs provide an outline of a networked environment followed by a discussion of the operation of the same. FIG. 1 illustrates an example networked environment 100 according to various examples described herein. The networked environment 100 includes an enterprise computing environment 103 and client device 106.

The enterprise computing environment 103 can be embodied as one or more computers, computing devices, or computing systems. In certain embodiments, the enterprise computing environment 103 can include one or more computing devices arranged, for example, in one or more server or computer banks. The computing device or devices can be located at a single installation site or distributed among different geographical locations. The enterprise computing environment 103 can include a plurality of computing devices that together embody a hosted computing resource, a grid computing resource, or other distributed computing arrangement. In some cases, the enterprise computing environment 103 can be embodied as an elastic computing resource where an allotted capacity of processing, network, storage, or other computing-related resources varies over time. As further described below, the enterprise computing environment 103 can also be embodied, in part, as certain functional or logical (e.g., computer-readable instruction) elements or modules as described herein.

The enterprise computing environment 103 can operate as an environment for mobile device management or a UEM platform that can manage the client devices 106. In that context, the computing environment 103 includes a data store 110. The enterprise computing environment 103 can also execute a management service 120 and an email server 121. In some implementations, the email server 121 can be a third-party email service that is executed in a separate computing environment. For example, the email server 121 can correspond to a hosted email service utilized by the enterprise to provide email accounts for its users. In this implementation, the email server 121 may not be executed by the enterprise computing environment 103.

The email server 121 can be hosted by a third party or on premises of the enterprise. The email server 121 can also provide a user's contacts, calendar, notes, and other data. These various services can be integrated such that a user's email and calendar go together. For example, users can add items to their calendar, create meeting events, respond to invitations, and otherwise manage their schedule in a manner that is integrated with email.

The key rotation service 123 represents an application or service that can facilitate rotation of encryption keys on client devices 106 that are enrolled as managed devices or that are running an email client according to examples of the disclosure. As described herein, one or more encryption keys can be utilized to encrypt email account data stored on the client device 106. The encryption keys can be rotated periodically utilizing a remotely executed key rotation service 123 that can escrow encryption keys utilized by an email client on the client device 106. The key rotation service 123 can also initiate rotation of encryption keys on the client device 106.

The data store 110 can comprise a database or other data storage system that can be utilized by the enterprise computing environment 103. The data store 110 can include device data 112, and user data 127, among other types of data. The management service 120 can operate as a UEM platform that can manage client devices 106 that are enrolled as managed devices with the management service 120. The management service 120 can be executed separately from the email server 121. In some implementations, the email server 121 can be operated by a different entity and in a different enterprise computing environment 103 from the management service 120.

Device data 112 can represent information about client devices 106 that are enrolled as managed devices with the management service 120. The device data 112 can include a device identifier, certificates associated with the client device 106, a user identifier identifying the user account with which the device is linked, authentication tokens provided by an identity provider to the client device 106, configuration profiles assigned to the client device 106, and other information regarding management of the client device 106 as an enrolled device.

The device data 112 can include escrowed keys 126, which are encryption keys escrowed by the key rotation service 123 on behalf of a client device 106 that is running an email client according to examples of the disclosure. An email client can generate one or more encryption keys that are used to encrypt data associated with the email accounts that are accessed by the email client. The email client can communicate with the key rotation service 123 to escrow the keys as escrowed keys 126. The key rotation service 123 can also generate new keys, or rotate the keys, and provide the newly generated rotated keys to the email client for use on the client device 106.

User data 127 represents information about users who have user accounts in the enterprise. These users can also have one or more client device 106 that are enrolled as managed devices with the management service 120. User data 127 can include authentication data, information about third party services with which the user is assigned an account, and information about an email server 121 through which the user receives email and calendar services.

The management service 120 can enroll several client devices 106 for mobile device management services. To begin enrollment, the management service 120 can identify and authenticate one of the client devices 106 and store data related to the client device 106 in the device data 112 for later reference. In some cases, the management service 120 (or a management agent or application executing on the client device 106) can also be registered as a device administrator (at least in part) of the client device 106, permitting the management service 120 to configure and manage certain operating aspects of the client device 106.

Once the client device 106 is enrolled for device management by the management service 120, the management service 120 can direct the installation of various software components or applications on the client device 106. The software components can be configured on the client device 106 at the direction of the management service 120. Such software components can include, for example, applications, resources, libraries, and other related components.

The management service 120 can also transmit management policies, compliance rules, and configuration data for execution by and/or enforcement on the client device 106. In that context, during or after enrollment, the management service 120 can retrieve or generate a set of management policies, compliance rules, and configuration data for the client device 106 and transfer those policies, rules, and data to the client device 106 for reference by the operating system and certain applications executing on the client device 106.

The management service 120 can also provide a management console as an engine and console interface for device management of the client devices 106. An information technology administrator or user, for example, can view, administer, and update the management policies, compliance rules, and configuration data on the client devices 106 using the management console. The policies, rules, and configuration data can be collectively administered for several of the client devices 106 by organizing the client devices 106 into several different groups or categories of devices according to organizational or other factors or considerations.

In some implementations, the enterprise computing environment 103 can execute an email notification service, which can be an engine or server that can be associated with an email client running on a client device 106. The email notification service can be implemented within the enterprise computing environment 103 or in another computing environment. The email notification service generate notifications corresponding to email messages, meeting invitations, and other data for which notifications are generated by the email client on the client device 106. In some operating system ecosystems, such as mobile operating systems, an ecosystem developer might require that incoming notifications to a client device 106 to be sent through a notification service that is managed by the mobile operating system provider. For example, Apple iOS®, in some instances, require notifications to be sent to a user's device using a notification API like Apple Push Notification Service (APNS). APNS is a service that is operated by Apple and not the application developer. Analogously, Android devices can be configured to receive device notifications through an operating system provider API.

Accordingly, because the email server 121 can be operated by an entity that is different from the operating system of the client device 106, the email notification service is a service that is separate from the email server 121 and separate from the operating system of the client device 106. The email notification service can be instrumented to receive information about email messages received by the email server 121 on behalf of a user. Then, the email notification service can provide data to an email client on the client device 106 so that device notifications can be generated. For example, if the email client is set up to display or sound a notification whenever an email message is received, the email notification service can detect an incoming message to the email server 121 and transmit information about the email message to the email client so that the email client can generate the notification with information about the email message on the device.

The client device 106 is representative of one or more client devices. Each client device 106 can be embodied as any computing device, processing circuit, or processor based device or system, including those in the form of a desktop computer, a laptop computer, a tablet computer, a personal digital assistant, a cellular telephone, a wearable computing device, or a set-top box, among other example computing devices and systems. Depending upon its primary purpose or function, for example, the client devices 106 can include various peripheral devices or components. The peripheral devices can include input or communications devices or modules, such as keyboards, keypads, touch pads, touch screens, microphones, cameras, wireless communications modules (e.g., infra-red, WI-FI, or BLUETOOTH®), buttons, switches, or sensors. The peripheral devices can also include a display, indicator lights, speakers, global positioning system (GPS) circuitry, accelerometers, gyroscopes, or other peripheral devices depending upon the primary purpose or function of the client devices 106.

As illustrated in FIG. 1, an example client device 106 can be enrolled by the management service 120 for device management. A management component 145 can be installed on a client device 106 locally manage the device on behalf of the remotely executed management service 120. The management component 145 can be installed with elevated privileges or be effectuated through operating system APIs to manage the client device 106 on behalf of the management service 120. The management component 145 can have the authority to manage data on the client device 106, install, remove, or disable certain applications, or install configuration profiles, such as VPN certificates, encryption keys, certificates, Wi-Fi profiles, email profiles, etc.

The management component 145 can alter operation of the client device 106 in response to commands or policies provided by the management service 120 or key rotation service 123 to the client device 106. The management component 145, in one instance, can poll the management service 120, or a command queue associated with the management service 120, to determine whether a management command intended for the client device 106 has been sent to the client device 106. In response to the command queue having a command for a client device 106, the management component 145 can retrieve the command and execute the command on the client device 106. The command might instruct the management component 145 to rotate encryption keys stored on the client device, install a configuration profile, enforce a restriction or policy, or take other management actions on the client device 106. In one example, the management service 120 might detect that the client device 106 is out of compliance with respect to a compliance rule and might instruct the management component 145 to restrict a hardware feature of the client device 106, delete data from the client device 106, or disable certain applications on the client device 106. The management component 145 can also take other variations of management actions on the client device 106 as directed by the management service 120.

The email client 148 can represent an application through which a user of the client device 106 can access email accounts. The email accounts can be hosted by the email server 121 or third-party email services. The email client 148 can also include functionality that allows the user to access his or her calendar and/or contacts that can also be hosted by the email server 121. Additionally, according to examples of this disclosure, the email client 148 can allow multiple email accounts to be accessed and encrypted using different encryption keys.

The client device 106 can also include a client device data store 150. The client device data store 150 can represent a memory, flash memory, mass storage, or any data storage resources of the client device 106. The client device data store 150 can house data that is managed by the operating system and data that is managed by applications that are installed on the client device 106. In one example, the operating system of the client device 106 can provide and manage a secure storage area 151. The client device data store 150 can comprise a secure storage area 151 such as the iOS or MacOS Keychain, a password manager, or a protected data storage area where credentials, passwords, and other sensitive data can be stored and accessed by applications. The operating system can manage access to the client device data store 150 by applications by requiring that the application obtain user permission and/or user authentication before allowing items to be stored and/or read from the client device data store 150.

For example, the operating system can require that a biometric input, such as a fingerprint verification or facial recognition process, be performed by an application requesting access to the secure storage area 151. The operating system can trigger a biometric or passcode authentication process whenever an application attempts to access the secure storage area 151. The operating system can provide access to the secure storage area 151 upon successful authentication of an aspect of the user, such as a biometric input or a passcode. The operating system can return an error in response to a failed verification of a user's passcode or biometric data by the operating system.

The client device data store 150 can also include an email client database 153. The email client database 153 can include a database created by or managed by the email client 148 and that contains email account data associated with the email accounts with which the email client 148 has been configured. The email client database 153 can include account information, such as server addresses and user authentication data for an email account, the mailboxes and folders associated with an email account added to the email client 148 by the user, calendar data, contact data, tasks, notes, and other information that can be associated with an email account and synchronized with the email client 148.

Accordingly, the email client database 153 can include email account data 158. A user can add multiple email accounts to the email client 148. Accordingly, the email client 148 can store multiple instances of email account data 158 for the respective email accounts that are added to the email client 148. According to examples of the disclosure, email account data 158 corresponding to the each of the email accounts added to the email client 148 can be encrypted using different encryption keys, as will be described in further detail herein.

To facilitate examples of the disclosure, the email client 148 can generate a master key 155, which the email client 148 can store in the secure storage area 151. The master key 155 can be an encryption key generated by the email client 148 upon an initial launch. The email client 148 can encrypt other keys with the master key 155. The other keys, which can also be stored in the secure storage area 151, can include an account key 157. An account key 157 represents an encryption key that is used to encrypt data corresponding to a particular email account added by the user to the email client 148. Upon receiving a request to add an email account to the email client 148, the email client 148 can generate an account key 157. The generated account key 157 can be used to encrypt the email account data stored in the email client database 153 for that email account. Upon receiving a request to add a second email account to the email client 148 that can be accessed using the email client 148 by the user, the email client 148 can generate a second account key 157 for the second email account. The account keys 157 can be stored in the secure storage area 151.

The management service 120 and/or management component 145 can be registered as a device administrator of the client device 106, permitting the management service 120 and/or management component 145 to manage certain operating aspects of the client device 106. In either case, the management service 120 can remotely configure the client device 106 by interacting with the management component 145. The management service 120 can also transfer various software components to the client device 106, and those software components can be installed and/or configured on the client device 106 at the direction of the management component 145. Such software components can include, for example, applications, resources, libraries, drivers, device configurations, or other related components. The management service 120 can also transfer various management policies, compliance rules, and configuration data for enforcement on the client device 106, and those policies, rules, and data can be stored on the client device 106 by the management component 145 The management service 120 can then instruct the management component 145 and the operating system of the client device 106 to enforce the management policies, compliance rules, and configuration data stored on the client device 106.

The network 111 can include the Internet, intranets, extranets, wide area networks (WANs), local area networks (LANs), wired networks, wireless networks, cable networks, satellite networks, other suitable networks, or any combinations thereof. As one example, the computing environment 103 and the client devices 106 can be respectively coupled to one or more public or private LANs or WANs and, in turn, to the Internet for communication of data among each other. Although not shown in FIG. 1, the network 111 can also include communicative connections to any number and type of network hosts or devices, such as website servers, file servers, cloud computing resources, databases, data stores, or any other network or computing architectures.

Figure 2:
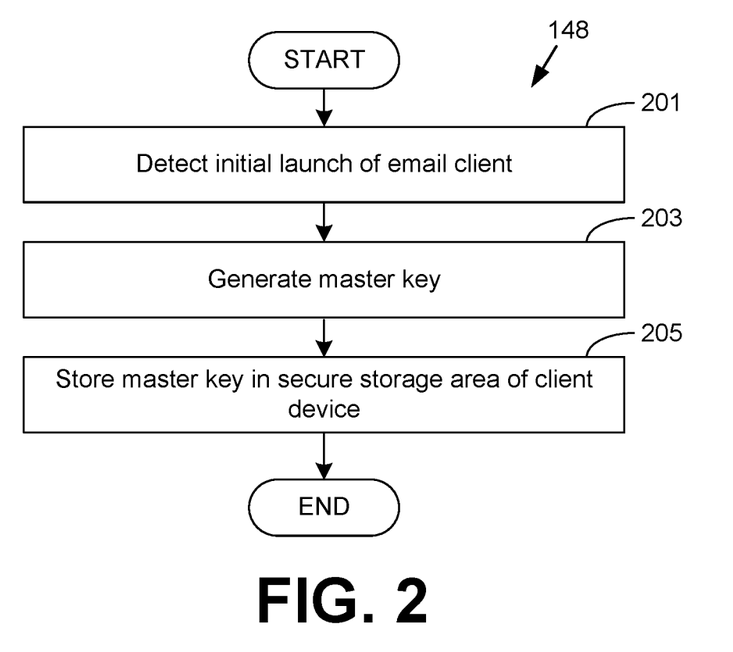
FIG. 2 illustrates a flowchart according to various examples described herein.

Moving now to FIG. 2, shown is an example flowchart illustrating interactions between the systems shown in FIG. 1. The flowchart illustrates how the email client 148 can generate a master key that can be utilized to facilitate account-specific security or encryption of email account data according to examples of the disclosure.

First, at step 201, the email client 148 can detect an initial launch of the email client 148. An initial launch represents the first time the email client 148 is launched on behalf of a particular user on the client device 106. In some examples, the process shown in FIG. 2 can be performed by the management component 145 so that the first time the user launches the email client 148, the steps shown in FIG. 2 have already been performed. In some examples, the email client 148 or management service 120 can perform the process of generating a master key 155 on behalf of a user of the email client 148.

At step 203, the email client 148 can generate a master key 155. The master key 155 represents an encryption key that can be used to encrypt account keys 157. The master key 155 can be a secure hash algorithm 2 (SHA-2) value that can be used as an encryption key or an input into an encryption algorithm. The master key 155 can be generated by the email client 148 based on a random number, a pseudorandom number, a biometric input from the user, a time-based input, or any other input. For example, the master key 155 can be generated by requesting a passcode or biometric input from the user, such as a fingerprint, facial identification, or other biometric input that can be captured by the client device 106. The email client 148 can generate the master key 155 utilizing a key generation algorithm with which the email client 148 is instrumented or using an operating system API that is associated with the secure storage area 151. The biometric input or passcode can be discarded after storing the master key 155 to the secure storage area 151 or after an other access to the secure storage area 151.

Upon generating the master key 155, at step 205, the email client 148 can store the master key 155 in the secure storage area 151. The operating system of the client device 106 can require user authentication, such as via a passcode or biometric authentication, before allowing the email client 148 to access the secure storage area 151. The operating system can prompt the user for a passcode or biometric input. Upon successful user authentication, the operating system can grant access to the secure storage area 151 so that the email client 148 can store the generated master key 155. When access to the secure storage area 151 is granted, the email client 148 can store the master key 155 to the secure storage area 151. Thereafter, the process can proceed to completion.

Figure 3:
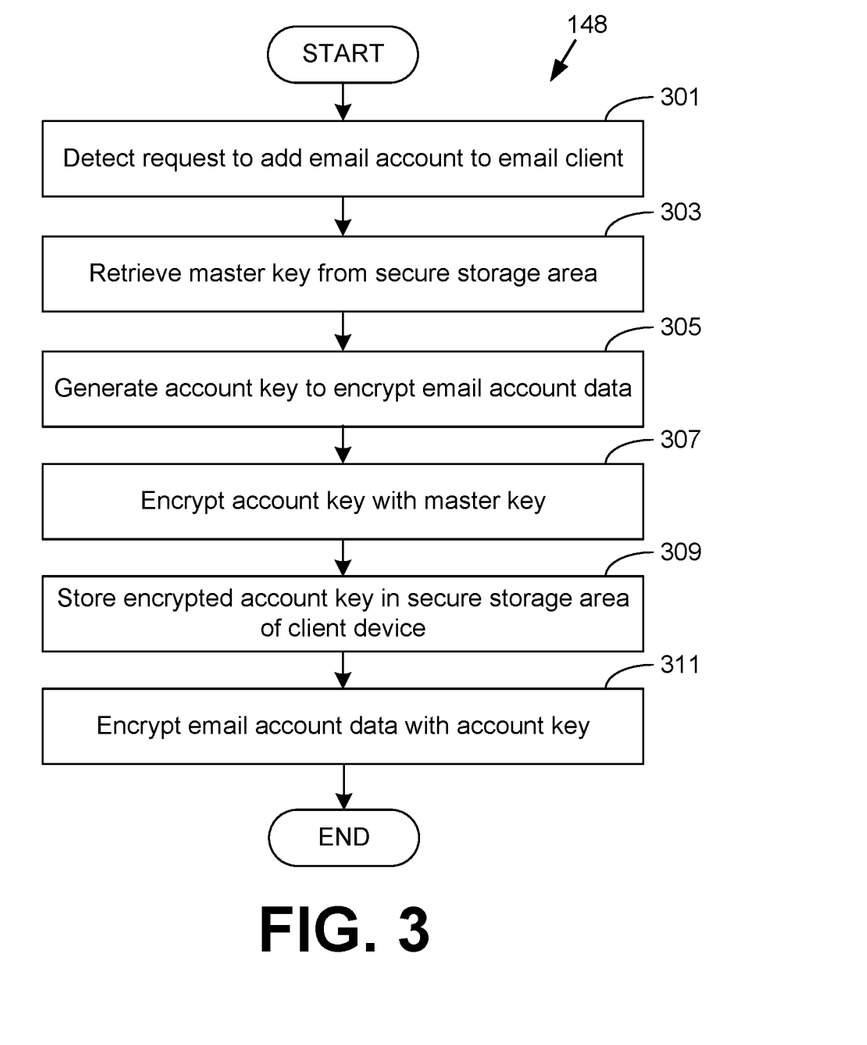
FIG. 3 illustrates a flowchart according to various examples described herein.

Referring next to FIG. 3, shown is a flowchart that illustrates how email client 148 can generate an account key that can be used to encrypt email account data for an email account added to the email client 148 by a user. First, at step 301, the email client 148 can receive or detect a request to add an email account to the email client 148. By adding an email account to the email client 148, the user is adding an email account that the user desires to use, access, or synchronize with the email client 148. The request to add the email account can take the form of a user selecting an option or feature in the email client 148 to add or enable access to an email account. The option can require the user to enter email account details, such as server addresses, usernames, passwords, certificates, and other options necessary to access the email account.

At step 303, the email client email client 148 can retrieve the master key 155 that was previously generated. The master key 155 can be retrieved from the secure storage area 151 associated with the client device 106. The operating system of the client device 106 can require user authentication via a passcode or biometric input before allowing access to the secure storage area 151. Accordingly, if access to the secure storage area 151 is granted by the operating system, the email client 148 can retrieve the master key 155 from the secure storage area 151.

At step 305, the email client 148 can generate an account key 157. The account key 157 represents an encryption key that can be used to encrypt email account data 158 stored in the email client database 153. The account key 157 can be a secure hash algorithm 2 (SHA-2) value that can be used as an encryption key or an input into an encryption algorithm. The account key 157 can be generated by the email client 148 based on a random number, a pseudorandom number, a biometric input from the user, a time-based input, or any other input. For example, the account key 157 can be generated by requesting a passcode or biometric input from the user, such as a fingerprint, facial identification, or other biometric input that can be captured by the client device 106. The email client 148 can generate the account key 157 utilizing a key generation algorithm with which the email client 148 is instrumented or using an operating system API that is associated with the secure storage area 151.

At step 307, the email client 148 can encrypt the generated account key 157 with the master key 155. The email client 148 can utilize an encryption process that utilizes the master key 155 as an input along with the generated account key 157. The email client 148 can generate an encrypted account key 157 that can be saved to the secure storage area 151.

At step 309, the email client 148 can store the encrypted account key 157 in the secure storage area 151. The operating system of the client device 106 can require user authentication, such as via a passcode or biometric authentication, before allowing the email client 148 to access the secure storage area 151. The operating system can prompt the user for a passcode or biometric input. Upon successful user authentication, the operating system can grant access to the secure storage area 151 so that the email client 148 can store the encrypted account key 157. When access to the secure storage area 151 is granted, the email client 148 can store the account key 157 to the secure storage area 151.

At step 311, the email client 148 an encrypt email account data using the account key 157. For example, the email client 148 can create a database corresponding to the email account in the email client database 153. As email, calendar, contact and other data are retrieved from or synchronized with the email client 148, the data can be stored in a database that is encrypted using the account key 157 or encrypted with the account key 157 before it is stored in the email client database 153. Thereafter, the process can proceed to completion.

Figure 4:
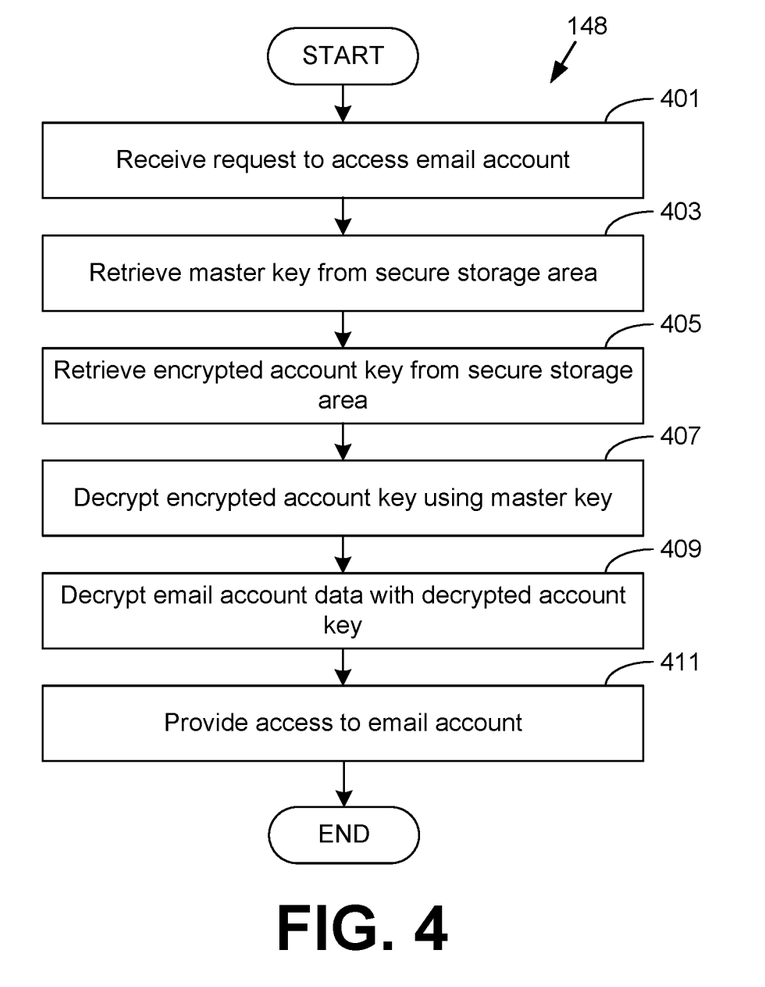
FIG. 4 illustrates a flowchart according to various examples described herein.

Referring next to FIG. 4, shown is a flowchart that illustrates how email client 148 can provide access to an email account that is synchronized with the email client 148. The email account data 158 corresponding to the email account is encrypted with an account key 157.

First, at step 401, the email client 148 can receive a request to access an email account that is synchronized with the email client 148. The request can take the form of the user navigating to an email message, folder, calendar item, contact, or other data associated with the email account within the email client 148.

Upon receiving the request, the email client 148 can retrieve the master key 155 from the secure storage area 151 at step 403. As noted above, the operating system of the client device 106 can require user authentication, such as via a passcode or biometric authentication, before allowing the email client 148 to access the secure storage area 151. The operating system can prompt the user for a passcode or biometric input. Upon successful user authentication, the operating system can grant access to the secure storage area 151 so that the email client 148 can retrieve the master key 155. In some implementations, the operating system may not require user authentication each time access to the secure storage area 151 is requested by the email client 148. In some cases, the operating system might require user authentication upon launch of the email client 148 or only periodically.

At step 405, the email client 148 can retrieve the encrypted account key 157 corresponding to the email account from the secure storage area 151. The account key 157 can be encrypted using the master key 155. The account key 157 is used to encrypt email account data 158 corresponding to the email account in the email client database 153. However, because the account key 157 is stored in the secure storage area 151 is encrypted form, the account key 157 should be decrypted before accessing the email account data 158 in the email client database 153.

At step 407, the email client 148 can decrypt the encrypted account key 157 using the master key 155. The decrypted account key 157 can be used to access the encrypted email account data 158 from the email client database 153. At step 409, the email client 148 can decrypt the email account data 158 from the email client database 153 using the decrypted account key 157. At step 411, the email client 148 can provide access to the email account using the decrypted account key 157. Thereafter, the process proceeds to completion.

In some implementations, the email client 148 can permit sharing of content between email accounts within the email client 148. For example, the user may have data, such as an email, a contact, attachment, or calendar entry, that is stored in a first email account. The user may wish to share the data to a second email account that is accessed using the email client 148. Accordingly, the email client 148 can utilize the account key 157 for a first email account to retrieve data from the first email account, and then utilize the account key 157 for a second email account to store data to the second email account in the email client database 153.

Additionally, in some implementations, the email client 148 can utilize the key rotation service 123 to rotate account keys 157 that are used to encrypt email account data 158 for respective email accounts that are accessed using the email client 148. In one example, the email client 148 can escrow account keys 157 and/or the master key 155 with the key rotation service which can stored the keys as escrowed keys 126. The key rotation service 123 can periodically rotate the escrowed keys 126 by generating a new account key 157 and providing the newly generated account key 157 to the email client 148 or management component 145. The newly generated account key 157 provided by the email client 148 can be encrypted using the master key 155 and stored in the secure storage area 151.

The flowcharts in FIGS. 2-4 show examples of the functions and operation of the components described herein. The components described herein can be embodied in hardware, software, or a combination of hardware and software. If embodied in software, each element can represent a module or group of code that includes program instructions to implement the specified logical function(s). The program instructions can be embodied in the form of, for example, source code that includes human-readable statements written in a programming language or machine code that includes machine instructions recognizable by a suitable execution system, such as a processor in a computer system or other system. If embodied in hardware, each element can represent a circuit or several interconnected circuits that implement the specified logical function(s).

The enterprise computing environment 103 and client device 106 can include at least one processing circuit. Such a processing circuit can include, for example, one or more processors and one or more storage or memory that are coupled to a local interface. The local interface can include, for example, a data bus with an accompanying address/control bus or any other suitable bus structure. Similarly, the client devices 106 can each include at least one processing circuit. Such a processing circuit can include, for example, one or more processors and one or more storage or memory devices that are coupled to a local interface.

The storage or memory devices can store data or components that are executable by the processors of the processing circuit. For example, the management service 120 and/or other components can be stored in one or more storage devices and be executable by one or more processors in the environment 100. Similarly, the agents, services, applications and/or other components described herein can be stored in one or more storage devices and be executable by one or more processors in the client device 106.

The management service 120, email client 148, and/or other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include, for example, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that include software or program instructions can be embodied in any non-transitory computer-readable medium for use by or in connection with an instruction execution system such as, a processor in a computer system or other system. The computer-readable medium can contain, store, and/or maintain the software or program instructions for use by or in connection with the instruction execution system.

A computer-readable medium can include a physical media, such as, magnetic, optical, semiconductor, and/or other suitable media. Examples of a suitable computer-readable media include, but are not limited to, solid-state drives, magnetic drives, or flash memory. Further, any logic or component described herein can be implemented and structured in a variety of ways. For example, one or more components described can be implemented as modules or components of a single application. Further, one or more components described herein can be executed in one computing device or by using multiple computing devices.

Further, any logic or applications described herein, including the management service 120 and/or other components can be implemented and structured in a variety of ways. For example, one or more applications described can be implemented as modules or components of a single application. Further, one or more applications described herein can be executed in shared or separate computing devices or a combination thereof. For example, a plurality of the applications described herein can execute in the same computing device, or in multiple computing devices. Additionally, terms such as "application," "service," "system," "engine," "module," and so on can be used interchangeably and are not intended to be limiting.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A method for account-specific security in an email client, comprising:
   generating, by an email client in response to an initial launch of the email client, a master key corresponding to the email client, the master key generated based upon an aspect of a user associated with a client device running the email client;
   storing, by the email client, the master key in a secure storage area of an operating system executed by the client device;
   receiving, by the email client, a request to access a first email account;
   generating, by the email client, a first account key associated with the first email account;
   encrypting, by the email client, the first account key using the master key;
   storing, by the email client, the first account key in the secure storage area;
   encrypting, by the email client, first email account data in an email database associated with the email client using the first account key;
   receiving, by the email client, a request to access a second email account;
   generating, by the email client, a second account key associated with the second email account, wherein the second account key is different from the first account key;
   encrypting, by the email client, the second account key using the master key;
   storing, by the email client, the second account key in the secure storage area; and
   encrypting, by the email client, second email account data in the email database associated with the email client using the second account key.

2. The method according to claim 1, further comprising:
   receiving, by the email client; a request to access the first email account;
   authenticating, in response to the request to access the first email account, access to the secure storage area of the operating system;
   obtaining, by the email client, the encrypted first account key from the secure storage area in response to authenticating access to the secure storage area;
   obtaining, by the email client, the master key from the secure storage area in response to authenticating access to the secure storage area;
   decrypting, by the email client, the encrypted first account key using the master key;
   decrypting, by the email client, the first email account data using the first account key; and
   providing, by the email client, access to the first email account.

3. The method according to claim 2, further comprising:
receiving, by the email client; a request to access the first email account;
authenticating, in response to the request to access the first email account, access to the secure storage area of the operating system;
obtaining, by the email client, the encrypted first account key from the secure storage area in response to authenticating access to the secure storage area;
obtaining, by the email client, the master key from the secure storage area in response to authenticating access to the secure storage area;
decrypting, by the email client, the encrypted first account key using the master key;
decrypting, by the email client, the first email account data using the first account key; and
providing, by the email client, access to the first email account.

4. The method according to claim 1, wherein storing the master key in the secure storage area of an operating system executed by the client device further comprises:
obtaining, by the email client, a biometric input or a passcode associated with the user;
accessing, by the email client, the secure storage area based upon the biometric input or the passcode associated with the user; and
storing the master key in the secure storage area.

5. The method according to claim 4, wherein the biometric input or the passcode associated with the user are discarded from memory after storage of the master key in the secure storage area.

6. The method according to claim 1, further comprising:
escrowing, by the email client, the first account key to a remotely executed key service, wherein the remotely executed key service periodically rotates the first account key.

7. The method according to claim 6, further comprising:
obtaining, by the email client, a rotated first account key from the remotely executed key service, wherein the rotated first account key is different from the first account key;
encrypting, by the email client, the rotated first account key with the master key; and
replacing, by the email client, the encrypted first account key with the encrypted rotated account key in the secure storage area.

8. A non-transitory computer-readable medium embodying program code for account-specific security in an email client executable by at least one computing device, the program code, when executed, causing the at least one computing device to at least:
generate, in response to an initial launch of the email client, a master key corresponding to the email client, the master key generated based upon an aspect of a user associated with a client device running the email client;
store, by the email client, the master key in a secure storage area of an operating system executed by the client device;
receive, by the email client, a request to access a first email account;
generate, by the email client, a first account key associated with the first email account;
encrypt, by the email client, the first account key using the master key;
store, by the email client, the first account key in the secure storage area;
encrypt, by the email client, first email account data in an email database associated with the email client using the first account key;
receive, by the email client, a request to access a second email account;
generate, by the email client, a second account key associated with the second email account, wherein the second account key is different from the first account key;
encrypt, by the email client, the second account key using the master key;
store, by the email client, the second account key in the secure storage area; and
encrypt, by the email client, second email account data in the email database associated with the email client using the second account key.

9. The non-transitory computer-readable medium according to claim 8, wherein the client device is further directed to at least:
receive, by the email client; a request to access the first email account;
authenticate, in response to the request to access the first email account, access to the secure storage area of the operating system;
obtain, by the email client, the encrypted first account key from the secure storage area in response to authenticating access to the secure storage area;
obtain, by the email client, the master key from the secure storage area in response to authenticating access to the secure storage area;
decrypt, by the email client, the encrypted first account key using the master key;
decrypt, by the email client, the first email account data using the first account key; and
providing, by the email client, access to the first email account.

10. The non-transitory computer-readable medium according to claim 9, wherein the client device is further directed to at least:
receive, by the email client; a request to access the first email account;
authenticate, in response to the request to access the first email account, access to the secure storage area of the operating system;
obtain, by the email client, the encrypted first account key from the secure storage area in response to authenticating access to the secure storage area;
obtain, by the email client, the master key from the secure storage area in response to authenticating access to the secure storage area;
decrypt, by the email client, the encrypted first account key using the master key;
decrypt, by the email client, the first email account data using the first account key; and
provide, by the email client, access to the first email account.

11. The non-transitory computer-readable medium according to claim 9, wherein storing the master key in the secure storage area of an operating system executed by the client device further comprises:
obtaining, by the email client, a biometric input or a passcode associated with the user;
accessing, by the email client, the secure storage area based upon the biometric input or the passcode associated with the user; and
storing the master key in the secure storage area.

12. The non-transitory computer-readable medium according to claim 11, wherein the biometric input or the passcode associated with the user are discarded from memory after storage of the master key in the secure storage area.

13. The non-transitory computer-readable medium according to claim 8, wherein the client device is further directed to at least:
   escrow, by the email client, the first account key to a remotely executed key service, wherein the remotely executed key service periodically rotates the first account key.

14. The non-transitory computer-readable medium according to claim 13, wherein the program code causes the at least one computing device to at least:
   obtain, by the email client, a rotated first account key from the remotely executed key service, wherein the rotated first account key is different from the first account key;
   encrypt, by the email client, the rotated first account key with the master key; and
   replace, by the email client, the encrypted first account key with the encrypted rotated account key in the secure storage area.

15. A system, comprising:
   a client device; and
   an email client executed by the client, the client device causing the client device to at least:
      generate, in response to an initial launch of the email client, a master key corresponding to the email client, the master key generated based upon an aspect of a user associated with a client device running the email client;
      store, by the email client, the master key in a secure storage area of an operating system executed by the client device;
      receive, by the email client, a request to access a first email account;
      generate, by the email client, a first account key associated with the first email account;
      encrypt, by the email client, the first account key using the master key;
      store, by the email client, the first account key in the secure storage area;
      encrypt, by the email client, first email account data in an email database associated with the email client using the first account key;
      receive, by the email client, a request to access a second email account;
      generate, by the email client, a second account key associated with the second email account, wherein the second account key is different from the first account key;
      encrypt, by the email client, the second account key using the master key;
      store, by the email client, the second account key in the secure storage area; and
      encrypt, by the email client, second email account data in the email database associated with the email client using the second account key.

16. The system according to claim 15, wherein the client device is further directed to at least:
   receive, by the email client; a request to access the first email account;
   authenticate, in response to the request to access the first email account, access to the secure storage area of the operating system;
   obtain, by the email client, the encrypted first account key from the secure storage area in response to authenticating access to the secure storage area;
   obtain, by the email client, the master key from the secure storage area in response to authenticating access to the secure storage area;
   decrypt, by the email client, the encrypted first account key using the master key;
   decrypt, by the email client, the first email account data using the first account key; and
   providing, by the email client, access to the first email account.

17. The system according to claim 16, wherein the client device is further directed to at least:
   receive, by the email client; a request to access the first email account;
   authenticate, in response to the request to access the first email account, access to the secure storage area of the operating system;
   obtain, by the email client, the encrypted first account key from the secure storage area in response to authenticating access to the secure storage area;
   obtain, by the email client, the master key from the secure storage area in response to authenticating access to the secure storage area;
   decrypt, by the email client, the encrypted first account key using the master key;
   decrypt, by the email client, the first email account data using the first account key; and
   provide, by the email client, access to the first email account.

18. The system according to claim 16, wherein storing the master key in the secure storage area of an operating system executed by the client device further comprises:
   obtaining, by the email client, a biometric input or a passcode associated with the user;
   accessing, by the email client, the secure storage area based upon the biometric input or the passcode associated with the user; and
   storing the master key in the secure storage area.

19. The system according to claim 18, wherein the biometric input or the passcode associated with the user are discarded from memory after storage of the master key in the secure storage area.

20. The system according to claim 15, wherein the client device is further directed to at least:
   escrow, by the email client, the first account key to a remotely executed key service, wherein the remotely executed key service periodically rotates the first account key.

* * * * *